Patented May 30, 1933

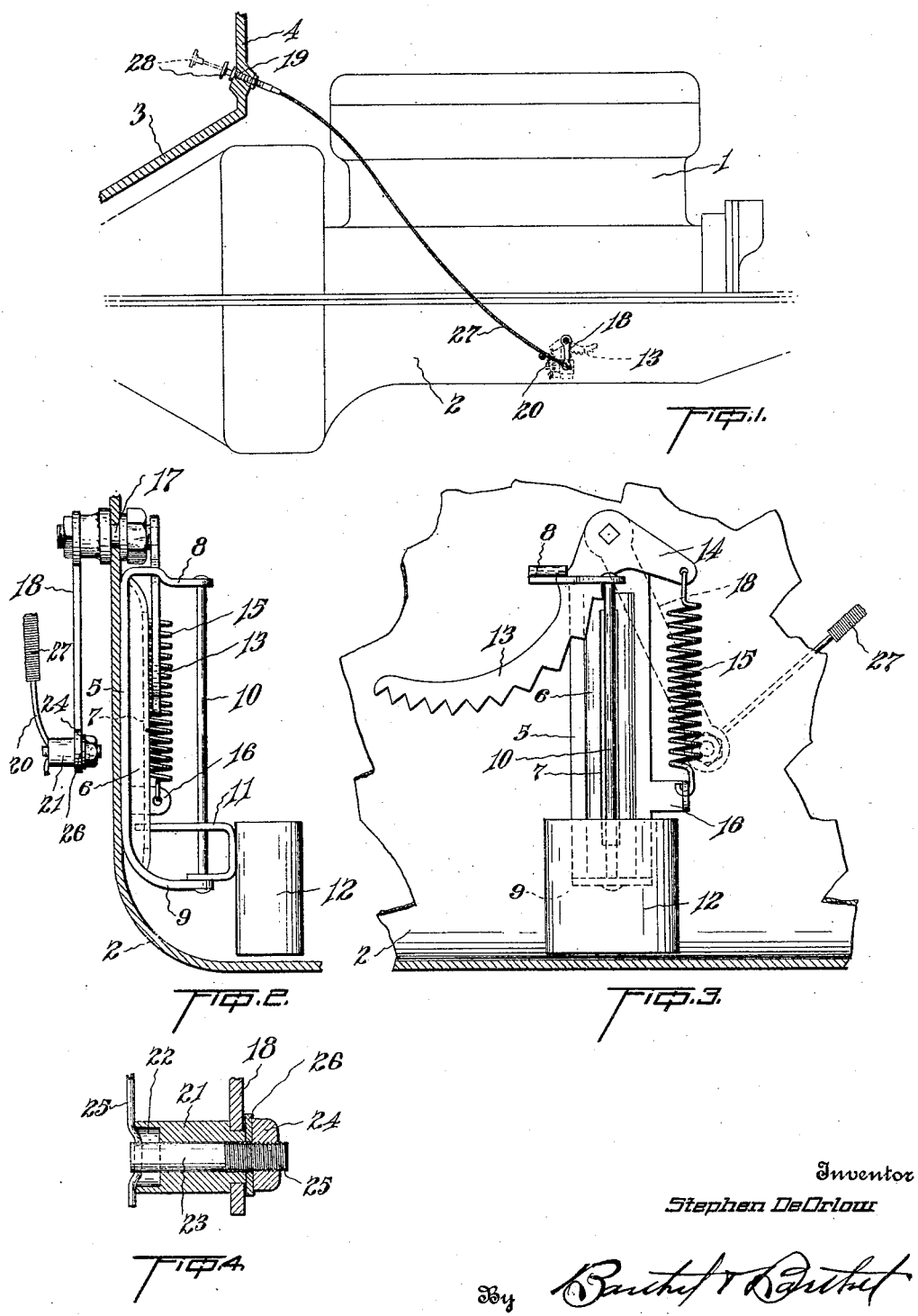

1,911,555

UNITED STATES PATENT OFFICE

STEPHEN DE ORLOW, OF LANSING, MICHIGAN

LIQUID LEVEL INDICATOR

Application filed January 25, 1928. Serial No. 249,369.

The present invention pertains to a novel level indicator designed particularly for showing the amount of oil in the crank case of a motor vehicle.

The principal object of the invention is to provide a device of this character which may be conveniently operated from the instrument board of the vehicle and which will furnish at the instrument board a reading indicating the oil level in the crank case. In this manner the invention avoids the present inconvenient method of determining the oil level which necessitates getting out of the car, raising the hood, dipping the slide in and out of the crank case, soiling the hands and clothing and finally obtaining a reading which is not reliable.

In the accomplishment of the object of the invention there is provided in the oil pan a guided float which moves in response to the oil level. Above the float is pivotally mounted a notched arm which may be swung into engagement with the float and stopped thereby. The relation of the arm to the float is such that the amplitude of the arm, or the arc through which it is permitted to swing until engaging the float, is a function of the height of the float and hence of the quantity of oil in the crank case. The arm is swung by means of a pull rod which extends through the dashboard to a point within easy reach of the driver. The operating end of the rod is calibrated to show the quantity of oil in the crank case, preferably with reference to the total capacity, and these graduations are manifestly proportioned to the amplitude of the arm and the height of the float.

The invention is fully disclosed by way of example in the following description and in the accompanying drawing, in which—

Figure 1 is an elevation of the apparatus applied to a motor vehicle;

Fig. 2 is a fragmentary transverse section of the oil pan or crank case, showing the apparatus in elevation;

Fig. 3 is a section of the crank case at right angles to Figure 2, showing the apparatus in elevation in the corresponding plane; and Fig. 4 is a detail section of the connecting means for the pull rod.

Reference to these views will now be made by use of like characters which are employed to designate corresponding parts throughout.

In Figure 1 is illustrated in outline the power plant 1 of a motor vehicle provided with the usual oil pan or crank case 2 and covered in part by a dashboard 3 and instrument board 4.

To the inner wall of the crank case is secured a guide member consisting of a stamping 5 having a raised portion 6 in which is formed a longitudinal or vertical slot 7. The stamping further includes integral arms 8 and 9 at the upper and lower ends thereof respectively and extending into the crank case. Between the ends of these arms is fixed a vertical guide rod 10 on which is slidably mounted a double arm 11 formed of a light metal such as aluminum. One end of this arm extends into the slot 7 to be guided therein as shown more clearly in Figure 2, and to the intermediate part of the arm is secured a float 12 which responds to the level of oil in the receptacle 2.

Above the guide member and within the tank is a bell crank lever pivotally attached to the side wall of the crank case 2. One of the arms of the lever is in the form of a curved notched member or ratchet 13. This member is adapted to swing between the side wall of the receptacle 2 and the rod 10, and in this manner to engage the arm 11. The remaining or shorter arm 14 of the bell crank lever is connected by a compressed spring 15 to a lug 16 extending from the stamping 5. The spring normally holds the arm 13 away from the arm 11. The upper arm 8 integral with the stamping serves as a stop member for limiting the retracting movement of the arm 13.

The pivotal attachment of the bell crank lever 13, 14 to the wall of the crank case is made by means of a stud 17 passing through the latter. To the outer end of the stud is secured an operating arm 18 forming part of the operating gear extending to the dashboard 4. A bushing 19 is fitted in the dashboard and accommodates one end of a slidable pull rod 20 which extends to the arm 18. In order to prevent the rod 20 from interfering with the stud 17 and associated parts, the connection of the lower end of the rod to the arm 18 is made through the medium of a spacer 21 applied to the lower end of the arm 18. The outer end of the spacer is formed with a cavity 22 and through the spacer is passed an axial bolt 23. The end of the bolt at the cavity 22 is apertured so that the rod 20 may be passed therethrough, and the rod is tightened by drawing the bolt 23 inwardly by means of a nut 24 on the threaded end 25 thereof. A washer 26 is preferably interposed between the nut 24 and the adjacent end of the spacer.

The rod 20, which is of a flexible nature, is preferably enclosed in a coiled wire tubing 27. The upper or operating end of the arm is formed with a button 28 to prevent slipping through the bushing 19, and this button is preferably designed in harmony with the other fittings on the instrument board.

The upper end of the rod 20 has certain markings thereon in terms of the capacity of the receptacle 2. In order to ascertain the level of oil in the crank case, the button 28 is pulled outwardly as shown in Figure 1 whereby the ratchet 13 swings towards the float. The swinging movement of the arm is limited by its engagement with the arm 11, which may be considered as a part of the float, and it will be apparent that the amplitude or the extent of the swinging movement of the arm 13 is an indication of the height of the float. The markings on the upper end of the rod 20, as indexed by the outer end of the bushing 19, are graduated to correspond to the height of the float in the tank when engaged by the arm 13. The notches in the arm permit positive and secure engagement between the members 13 and 11, so that the pull on the rod 20 will not tend to depress the float below its proper level. After the reading has been taken, the button 28 is merely released, whereupon the spring 15 raises the arm 13 to inoperative position.

Although a specific embodiment of the invention has been illustrated and described, it will be understood that various alterations in the details of construction may be made without departing from the scope of the invention as indicated by the appended claims.

What I claim is:

1. A liquid level indicator comprising a substantially vertical guide member, a float guided thereby and having a clearly defined edge, and a notched arm adapted to be pivotally supported relatively to said guide member and adapted to be swung downwardly into engagement with said edge, whereby the amplitude of the pivotal movement of said arm is determined by the position of the float.

2. In combination with a liquid receptacle, a pair of vertically spaced arms secured thereto and extending therefrom, a guide member carried by said arms, a float guided by said member, a notched arm pivotally supported relatively to said guide member and adapted to be swung downwardly into engagement with said float, whereby the amplitude of the pivotal movement of said arm is determined by the position of the float, means for normally holding said arm away from said float, one of said first named arms being disposed in the path of said notched arm and serving as a stop for limiting the retractile movement of said notched arm.

3. A liquid level indicator comprising a guide member, an arm vertically slidable thereon, a float carried by said arm, a notched arm adapted to be pivotally supported relatively to said guide member and adapted to be swung downwardly into engagement with the first named arm, whereby the amplitude of the pivotal movement of the notched arm is determined by the position of the float.

In testimony whereof I affix my signature.

STEPHEN DE ORLOW.